US009088952B2

(12) United States Patent
Leizerovich et al.

(10) Patent No.: US 9,088,952 B2
(45) Date of Patent: Jul. 21, 2015

(54) METHOD AND SYSTEM FOR AFFECTING POWER CONTROL IN A WIRELESS NETWORK

(71) Applicant: Alvarion Ltd., Tel-Aviv (IL)

(72) Inventors: Hanan Leizerovich, Petach Tikva (IL); Mirit Elyada-Bar, Moshav Bnei-Zion (IL)

(73) Assignee: ALVARION LTD. (IL)

( * ) Notice: Subject to any disclaimer, the term of this patent is extended or adjusted under 35 U.S.C. 154(b) by 237 days.

(21) Appl. No.: 13/685,696

(22) Filed: Nov. 26, 2012

(65) Prior Publication Data

US 2013/0142185 A1      Jun. 6, 2013

(30) Foreign Application Priority Data

Dec. 1, 2011   (IL) .......................................... 216736

(51) Int. Cl.
*H04W 52/26* (2009.01)
*H04W 52/34* (2009.01)
*H04W 52/24* (2009.01)
*H04W 52/28* (2009.01)

(52) U.S. Cl.
CPC ............ *H04W 52/26* (2013.01); *H04W 52/346* (2013.01); *H04W 52/241* (2013.01); *H04W 52/286* (2013.01)

(58) Field of Classification Search
CPC . H04W 52/26; H04W 52/346; H04W 52/286; H04W 52/241
USPC ................................ 370/310.2, 328, 318, 338
See application file for complete search history.

(56) References Cited

U.S. PATENT DOCUMENTS

| 8,509,179 | B1 * | 8/2013 | Delker et al. ................. 370/331 |
| 2003/0048856 | A1 * | 3/2003 | Ketchum et al. ............... 375/260 |
| 2005/0233698 | A1 * | 10/2005 | Mantha ........................ 455/63.1 |
| 2007/0189237 | A1 * | 8/2007 | Jaatinen et al. ............... 370/335 |

* cited by examiner

*Primary Examiner* — Paul H Masur
*Assistant Examiner* — Kabir Jahangir
(74) *Attorney, Agent, or Firm* — Hershkovitz & Associates, PLLC; Abe Hershkovitz

(57) ABSTRACT

A method device and system are provided for managing a wireless local area network comprising a plurality of station units (STAs), where each of the plurality of station units is adapted to wirelessly communicate with one or more access points. The method device and system comprises affecting power control over air time request packets transmitted by respective station units from among the plurality of STAs towards one of the one or more access points, so that all air time request packets are received at said access point at substantially the same Signal to Noise Ratio ("SNR"), and wherein said power control does not affect packets carrying payload data that proceeds the air time request packets transmitted by the respective station units.

8 Claims, 2 Drawing Sheets

METHOD AND SYSTEM FOR AFFECTING POWER CONTROL IN A WIRELESS NETWORK

CROSS-REFERENCE TO RELATED APPLICATIONS

This application claims priority benefit under 35 U.S.C. §119 of Israeli Patent Application No. 216736 filed Dec. 1, 2011, the entire contents of which is hereby incorporated by reference herein.

FIELD OF THE INVENTION

The present invention relates to Wireless Local Area networks (WLAN) located in indoor/outdoor area, and in particular, to a system, device and method for improve communications under WiFi conditions or in high collision uplink environments.

BACKGROUND

Many wireless communication networks are based on a contention protocol such as the Carrier Sense Multiple Access/Collision Avoidance (CSMA/CA) contention protocol. This protocol is used when a wireless station (e.g. a WLAN node) which is about to transmit communications, listens to the network (senses the carrier) before transmitting the communications and waits for an opportunity during which it may transmit the communications. The wireless station will not transmit as long as a packet is either currently detected in the air or air time was reserved by another wireless station for a predefined duration of time (virtual carrier sense). According to IEEE 802.11, the wireless station awaits a random period of time and then, if the air resource becomes available during that period, transmits the communications. If the receiver gets the frame intact, it sends back an ACK or a block ACK message (according to the request from the transmitter) to the sender, indicating that the packet has arrived. This protocol is mainly used for multiple-access and significantly reduces the possibility of contention, i.e. that two or more wireless stations (e.g. WLAN nodes) will be transmitting at the same time.

When deploying such wireless networks in a long range configuration, there is a known problem which is referred to in the art as the "hidden node" problem (also known as the "hidden terminal" problem). This problem addresses cases where a plurality of wireless stations (also referred to as mobile subscribers, mobile terminals, mobile stations etc.) which are connected to the same access point, do not "hear" each other, thus cannot detect the carrier of each other and consequently two or more stations may transmit with high probability at the same time thereby causing a collision. As a result, the Access Point (AP) is unable to detect neither one of the two or more transmitted signals, so that the two or more stations will select a larger contention window and try to retransmit after a random period—in which case collision might still happen again. As the same scenario might repeat itself, the stations will continue increasing the contention window until it is high enough to substantially reduce the probability of contention, and the final result would be low air efficiency. This problem increases along with the increase in the number of wireless stations.

Some suggestions were made in the art to address the "hidden node" problem. One such solution is described in our co-pending patent application No. 214002 filed on Jul. 10, 2011.

The IEEE 802.11 protocol for example, uses a feature called RTS/CTS mechanism. According to this mechanism, each wireless station that is about to transmit a communication, sends a short Request-To-Send (referred to hereinafter as "RTS") packet to its respective access point and the access point returns a Clear-To-Send (referred to hereinafter as "CTS") packet. Both packets include the expected duration of the wireless transaction. All the other wireless stations detect the RTS packet or the CTS packet and create virtual carrier sense, which prevents them from accessing the air while the data transaction is still being transmitted.

Although this solution reduces the "hidden node" problem, still, it does not completely solve it. The reason being that in case the RTS/CTS mechanism is used, RTS packets may still collide with each other, and the outcome is that these transmitting stations will have to retransmit their RTS packets.

The problem further increases in cases where the stations are deployed at different ranges from the access point or have high power differences at the access point input. In these cases, the transmissions sent by one station may be received at a much higher power than those transmitted by another (e.g. farther) station. In such cases, when collisions occur between packets in general and RTS packets specifically, there is a high probability that the packet arriving with the higher power will not fail, and although a collision has occurred, the stronger packet will be received while the weaker one will fail.

The adverse effect of this problem is felt significantly in long range deployments, where transmissions sent by some stations are received with low SNR while transmissions sent from others are received with high SNR, and consequently, the stations whose transmissions are received with high SNR might cause starvation to stations whose transmissions are received with low SNR.

As will be appreciated by those skilled in the art, the colliding RTS packets scenarios may also occur in indoor or short range conditions. For example, in a case where a high number of stations transmit long packets, RTS packets may be used to decrease the penalty on collision. In this case, instead of retransmitting the long packet every time a collision occurs, only RTS packets may be retransmitted, till a period of time has been established, during which a certain STA may transmit the long packets without experiencing any collisions from other STAs.

SUMMARY OF THE DISCLOSURE

The disclosure may be summarized by referring to the appended claims.

It is an object of the present invention to provide methods, systems and devices to improve performance WiFi systems in long range deployments without reducing PHY rate of the various stations.

It is another object of the present invention to provide methods, systems and devices that enable prevention of starvation in the ability to transmit for near/far or strong/weak deployment scenarios, especially in high air-consuming uplink scenarios.

It is yet another object of the present invention to provide methods, systems and devices to improve total system quality of service.

It is still another object of the present invention to provide methods, systems and devices to improve performance in certain applications such as enterprise uplink applications, e.g. video surveillance.

Other objects of the invention will become apparent as the description of the invention proceeds.

In an embodiment, a method is provided for managing a wireless local area network (e.g. centralized WiFi network) comprising a plurality of station units (STAs), where each of the plurality of station units is adapted to communicate wirelessly with one or more access points, wherein the method comprises affecting power control over air time request packets transmitted by respective station units from among the plurality of station units towards one access point (being the same access point for all of the plurality of station units), so that all air time request packets are received at that one access point at substantially the same Signal to Noise Ratio ("SNR"), and wherein that power control does not affect the transmission power at which packets carrying payload data that are transmitted following the air time request packets, are transmitted by the respective station units.

The term "air time request packet" as used herein throughout the specification and claims is used to denote any type of communication packet that is used in compliance with the applicable telecommunication protocol adopted in the system where the respective air time request packet is being transmitted, for the purpose of reserving a period of air time during which the access point after having acknowledged the STA request for reserving an air time, indicates to other STAs (as well as itself), to refrain from utilizing radio resources (e.g. occupying air time) needed for transmissions to be sent from the station unit sending the air time request packet. Such an air time request packet may be a member selected from among a group that consists of: a RTS packet, a first packet in a Transmit Opportunity (TXOP), a null data packet, a leading packet in an IEEE 802.11 packets' sequence, and the like.

The term "station unit" (STA) as used herein throughout the specification and claims should be understood to encompass a cellular telephone, a fixed wireless station, a desktop computer, a portable computer (e.g. laptop, tablet), a personal digital assistance (PDA), a wireless setup box or any other WLAN device.

According to another embodiment, the method provided comprising the steps of:
(i) providing an indication to each of the plurality of STAs to enable each respective STA to adjust its transmission power level for transmitting an air time request packet, and wherein this transmission power level is determined so that each of the air time request packets transmitted by at least two of the STAs when received at the access point, would be received at substantially the same Signal to Noise Ratio ("SNR") as any other transmitted air time request packet would be, when received at the access point;
(ii) at least one of the plurality of STAs, adjusting the transmit power prior to transmitting the air time request packet, to a level which is in conformity with the indication provided by the access point; and
(iii) at the at least one STA, re-adjusting the transmit power as needed (and if needed) to a different level for transmitting packets carrying payload data that would be transmitted following the transmission of the air time request packet.

In accordance with another embodiment, step (i) of the method provided, further comprises: receiving at the access point at least one packet transmitted by the at least one STA and evaluating the power level (e.g. SNR) at which that at least one packet was received at the access point.

By still another embodiment, step (i) of the method provided, further comprising: determining a power level or change in a power level at which the at least one STA will transmit the air time request packet, wherein the determination is based on the evaluation made and based on information available at the access point (e.g. noise level) and other information which relates for example to received powers of other STAs (from among the plurality of STAs) and the required rate and modulation of air time request packets.

According to another embodiment, the evaluation of the power level of the at least one packet received is based upon measurement of its power level as received at the access point.

By still another embodiment, the indication provided to the at least one STA which is associated with the required transmit power level, relates to a substantially minimum received SNR value allowed in the wireless local area network for receiving packets.

In accordance with yet another embodiment, the indication provided to the at least one STA, is associated with a minimum received SNR value required to properly receive the air time request packet according to the air time request packet transmission rate and the modulation thereof. This rate may include for example parameters, such as MIMO condition (number of spatial streams), space-time-block-coding or any other relevant packet parameters that may affect the required SNR to properly receive the packet. This embodiment is relevant for example in case where the air time request packet is not transmitted at the lowest allowable rate.

By still another embodiment, the indication provided to the at least one STA, relates to (or further relates to) one or more received power levels for transmitting air time request packets by other STAs from among the plurality of STAs. As will be appreciated by those skilled in the art, the air time request packets transmission power is typically adjusted somewhat higher than (i.e. so that there is a margin above) the minimum power required to obtain the necessary sensitivity of the air time request packet rate and modulation. Also, in case some STAs use different rates while transmitting their air time request packets, each STA's transmission power for transmitting air time request packets should be adapted so that the packets would be received at the required SNR.

In accordance with yet another embodiment, the indication provided to the at least one STA of the required transmit power level, relates to a lowest value of powers at which air time request packets were received at the access point, from among all currently operative STAs in the wireless local area network.

According to another embodiment, the indication provided to the at least one STA of the required transmit power level relates to the power level (e.g. SNR) at which the at least one packet transmitted by the at least one STA, was received at the access point.

According to still another embodiment, the method further comprising a step of determining by the at least one STA the transmit power required for transmitting its own air time request packets. Preferably, this determination is made to ensure that the determined transmit power meets a target SNR as published by the AP and according to other information gathered by the STA.

By yet another embodiment, the method further comprises a step of determining by the at least one STA the transmit power required for transmitting its own air time request packets, where this determination is made based upon information published by the access point (e.g. the above indication) and upon results of measurements performed by the STA.

According to another aspect, there is provided an STA adapted to operate in a wireless local area network (e.g. centralized WiFi network) and comprising:
a receiver configured to receive an indication from an access point to which the STA is about to transmit communication packets, wherein that indication comprises information that relates to a power level at which the STA should transmit its air time request packets;

a transmitter configured to wirelessly transmit packets towards that access point, wherein the transmission of packets carrying payload data is preceded by transmission of one or more air time request packets;

a transmit power controller configured to adjust the power at which the one or more air time request packets are transmitted from the transmitter in compliance with the indication received from the access point and/or decisions made by the STA, and to re-adjust the power at which the packets carrying payload data will be transmitted from the transmitter.

According to yet another aspect, there is provided a system operative in a wireless local area network which comprises an access point (e.g. a base station) and a plurality of station units (STAs), wherein each of the plurality of station units is adapted to wirelessly communicate with the access point, wherein each of the plurality of STAs comprises a power controller operative to affect transmit power control over air time request packets transmitted from its respective STA, so that all air time request packets transmitted from different STAs are received at the access point at substantially the same Signal to Noise Ratio, wherein the power controller of each of the STAs is operative to re-adjust the transmission power of the respective STA as needed (and when needed) before packets carrying payload data that follow the air time request packet are transmitted, and wherein the transmission power is re-adjusted to a required power level which is different from the power level at which the air time request packets were transmitted (e.g. for transmitting higher modulation packets), and preferably could be controlled independently of the control affected upon the transmission power level of the air time request packets. This required power level is actually unaffected by the air time request packets power control mechanism described above for the air time request packets, so that one or more of the packets carrying payload data may be transmitted at a transmission power which is substantially equal to the power at which they would have been transmitted if no power control was affected on their preceding air time request packets. In addition or in the alternative, one or more of the packets carrying payload data may be transmitted at a transmission power which is not equal to the power at which they would have been transmitted if no power control was affected on their preceding air time request packets, but yet different from the power at which their preceding air time request packet were transmitted.

According to another embodiment, the access point comprises a transmitter adapted to transmit an indication to each of the plurality of STAs to enable the power controller of each respective STA to adjust the transmission power level when transmitting an air time request packet in order to ensure that all air time request packets transmitted by station units towards the access point, are received thereat at substantially the same SNR.

In accordance with another embodiment, the access point comprises: a receiver configured to receive at least one packet transmitted by at least one of the plurality of the STAs, and a processor configured to evaluate the SNR at which said at least one packet was received at the access point.

By still another embodiment, the processor is further configured to and to determine a power level at which the at least one STA will transmit an air time request packet, based upon the evaluation and based on information available at the access point which relates to transmission powers of other STAs from among the plurality of STAs.

By yet a further embodiment, the indication transmitted by the access point to the at least one STA, relates to a transmit power of that at least one STA, that would result in a substantially minimum received power required in the wireless local area network for receiving communication packets at the access point.

In accordance with still another embodiment, the processor is further configured to compare power levels of packets received from all currently transmitting STAs in the wireless local area network, and to generate an indication for transmission to the at least one STA, wherein the indication relates to a lowest value identified by the processor from among the power levels at which the packets were received from the currently transmitting STAs.

According to another embodiment, the processor is further configured to generate an indication for transmission to the at least one STA, wherein the indication relates to a power level at which at least one packet transmitted by the at least one STA, was received at the access point receiver.

According to another embodiment, the AP publishes a reduced (e.g. minimum) amount of information to the STAs, where this reduced amount of information enables at least one of the STAs to determine its own transmit power level by itself.

In accordance with yet another embodiment, the indication transmitted by the access point of the system provided to the at least one STA, relates to a substantially minimum value needed in the wireless local area network for receiving air time request packets.

By still another embodiment, the indication transmitted by the access point of the system provided to the at least one STA, relates to a preconfigured received power for which air time request packets are expected to be received at.

BRIEF DESCRIPTION OF THE DRAWINGS

For a more complete understanding of the present invention, reference is now made to the following detailed description taken in conjunction with the accompanying drawings wherein.

DETAILED DESCRIPTION

Figure 1:
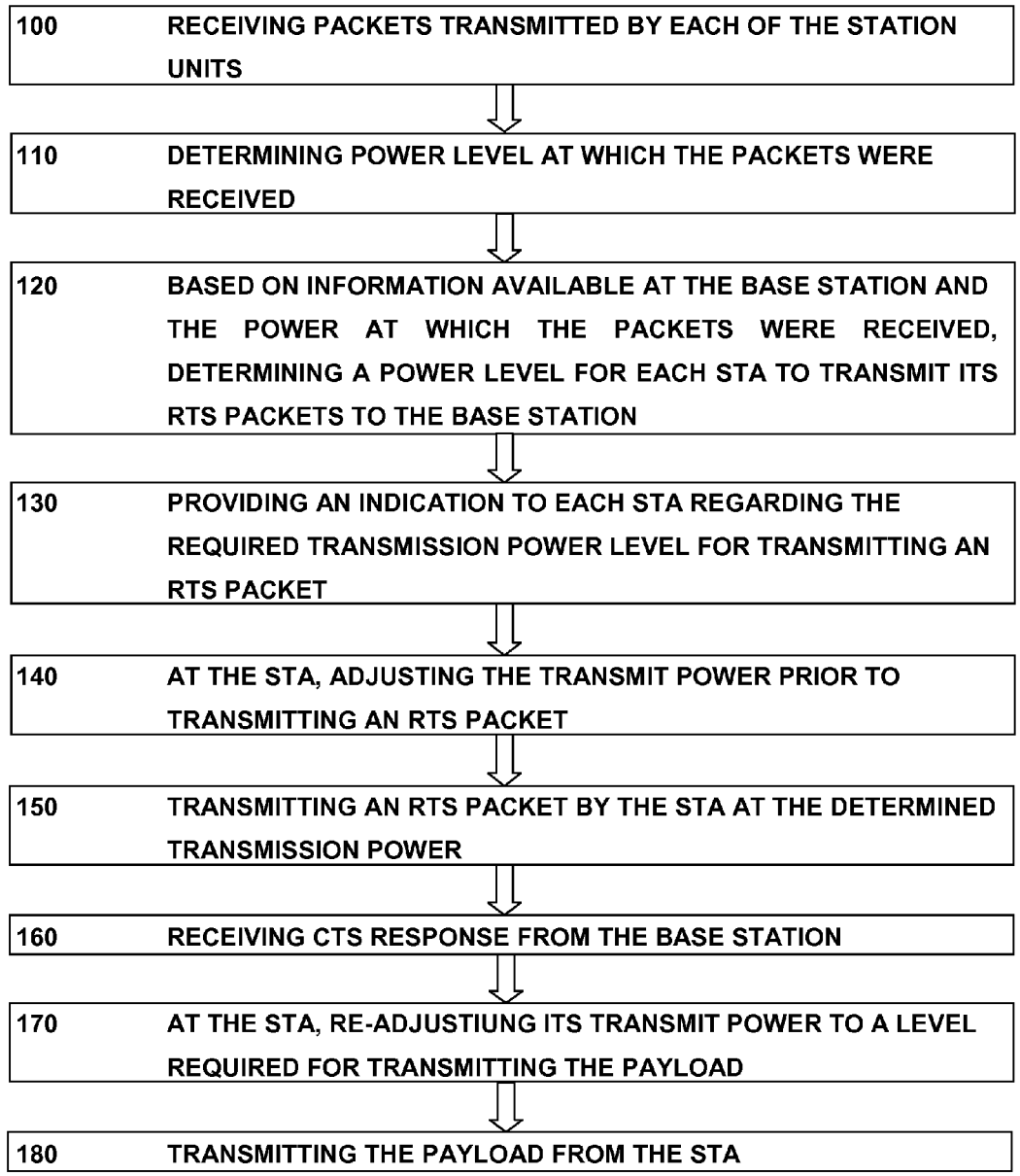
FIG. 1—demonstrates a flow chart of a method of implementing one embodiment of the present invention.

In this disclosure, the verb "comprise" is intended to have an open-ended meaning so that when a first element is stated to comprise a second element, the first element may also include one or more other elements that are not necessarily identified or described herein, or recited in the claims.

In the following description, for the purposes of explanation, numerous specific details are set forth in order to provide a thorough understanding of the present invention. It should be apparent, however, that the present invention may be practiced without these specific details.

The present invention may be implemented in WLAN systems in which station units need to transmit their own requests in order for their access point (e.g. base station) to refrain and prevent other stations from occupying radio resources, e.g. air time, for them to transmit. Such stations are typically unsynchronized endpoints using the CSMA/CA contention protocol, such as one of the various IEEE 802.11 standards, such as IEEE 802.11 a/b/g/n/ac/ad.

As was previously explained, as these requests are randomly transmitted, some of the packets comprising the various requests are likely to collide with each other, and the outcome is that these transmitting stations will have to retransmit their RTS packets, in the attempt to avoid such a collision. However, re-transmission does not necessarily solve the problem, and particularly if the station units are deployed at different ranges from their access point or their transmissions are received at different power levels by their access point. In these cases, the transmissions sent by one station unit may be received at the access point at a much higher power than those transmitted by another station unit. In such cases, when collisions occur between such air time request packets, there is a high probability for the packet arriving with the higher power to be received properly, and the weaker one will fail, and might even continue to fail in the next re-transmissions, as long as the air time request packets transmitted by the weaker transmitting station unit keep colliding with air time request packets transmitted by stronger transmitting station units. Therefore, in deployments where transmissions sent by some station units are received with low SNR whereas transmissions sent by others are received with high SNR (e.g. long range deployments), and consequently, the station units whose transmissions are received with high SNR might cause starvation to station unit(s) whose transmissions are received with low SNR.

Thus, one of the major underlying principles of the present invention is to ensure fairness in transmissions of air time request packets (such as RTS transmissions for example) between different clients, by guaranteeing that all these packets will be transmitted towards the AP (e.g. to the base station) at substantially the same SNR (or at substantially the same power, which is the equivalent of arriving at substantially the same SNR) to the AP side (e.g. to the base station). Once this principle is implemented, in case of collision, there would be no preference to one client over the other as no such packets would reach the AP at a higher power than the others.

The term "substantially the same SNR" as used herein and throughout the specification and claims, should be understood to relate to a range (i.e. a margin) of transmit power within which each of the transmitting STAs should set its transmit power. This range in which the STAs are allowed to transmit their air time request packets, which is encompassed by the definition of being received by the AP at "substantially the same SNR" is determined as follows. The minimum value of the range is equal to the value of the lowest power (SNR) at which an air time request packet may be received by the AP. The difference between the maximum value and the minimum value of this range is equal to a value that ensures that if one air time request packet is transmitted at a higher power than at least one of the others, upon colliding with the weaker packet, the stronger packet will not be able to be properly received by the AP and will therefore fail. Consequently, since according to the solution provided by the present invention, all air time request packets should be transmitted within this range, in case of a collision, all of the colliding air time request packets without exception, will fail. For example, the maximum (SNR) value may be equal to twice the minimum (SNR) value. To summarize the above, in order to satisfy the condition that every air time request packet is received by the AP at substantially the same SNR as those of the others, the STA should transmit such packets at a power level that satisfies the following two conditions:

1. Each air time request packet is received at a power that is high enough above the noise floor; and
2. In case of collision, all the air time request packets will fail, and consequently retransmission from the respective STAs will be required. Thus, a better fairness is achieved.

In order to ensure that the second condition is satisfied, the margin (range) could be set by taking into account the necessary sensitivity of the air time request packet rate and modulation. For example: if the lowest rate of an air time request packet which is in compliance with IEEE 802.11a is 6 Mbps and the SNR required to receive this packet by the base station is 3 dB, the transmit power of all STAs' air time request packets should be adjusted to be received within a range of up to 3 dB above the sensitivity level for receiving according to IEEE 802.11a at a rate of 6 Mbps, or in other words, up to 6 dB above the noise floor.

Let us turn now to FIG. 1 which demonstrates a flow chart of an example for a method implementing one embodiment of the present invention, by which a number of station units that belong to a WLAN network that is operative in accordance with the IEEE 802.11 Recommendation, send occasionally RTS packets (or any other type of applicable air time request packets) in order to reserve an air period of time, so that neither their base station nor the remaining STAs associated therewith, would use the reserved period of time.

First, the base station receives packets transmitted by each of the STAs served by that base station (step 100). Then, the base station determines the power level at which the various packets were received thereat (step 110).

Based on information available at the base station and the power at which the packets has been received, the base station determines the power level/change in power level for each of the STAs to transmit its RTS packets to the base station (step 120). This determination may be based for example on information regarding the minimal received power (of packets reaching the base station) allowed in that network. In another alternative, the determination may be based on the minimal receive power required for the base station to comprehend RTS packets received. By still another alternative the determination may be based on prior measurements of the received power at which RTS packets were previously received at the base station from each of the STAs, so that the determination made by the base station is that the power level for each of the STAs to transmit its RTS packets to the base station, is substantially equal to the lowest transmission power at which one of the RTS packets was previously received at the base station from among all the RTS packets received. Obviously, any other target received power level may be used for the RTS packets (e.g. preconfigured level or a level that depends on the received power of all the connected STAs, etc).

Based on the determination made, the base station provides an indication (an absolute or a relative indication) to each of the plurality of STAs (step 130) to enable each of them to adjust its own transmission power level before transmitting an air time request packet, wherein the transmission power level is selected so that each of the air time request packets transmitted by at least two of the STAs, would be received at the base station at substantially the same Signal to Noise Ratio ("SNR") as the other transmitted air time request packets. As explained above, the indication from the access point to the station units may include the values of a required power change, and in the alternative, it may include a value of absolute transmit power which the STAs have to comply with.

Prior to transmitting an RTS packet by each of the plurality of STAs, the STA adjusts its transmit power (step 140) by reducing it to a level being in conformity with the indication provided by the base station. Since RTS packets are short and are usually transmitted at the lowest modulation possible (to cover all the station units that need to be aware of the transaction), decreasing the transmission power, if needed, for the RTS packet will not cause a substantial rate decrease in the transmission of the RTS packet, and the CTS packet would be transmitted at the same rate anyway.

Next, after having adjusted its transmission power level to the required level, the RTS packet is transmitted at the adjusted transmission power (step 150) and upon receiving the response from the base station, the CTS packet (step 160) informing the STA that the requested resources are available for the duration of the rest of the transmission, the STA re-adjusts its transmit power (step 170) to a suitable level for transmitting the payload data, e.g. will increase the transmission power for transmitting packets carrying payload data within the period of time allocated for that STA to send these data carrying packets. The increase may be done for example to the transmission power level of that STA prior to reducing the power in accordance with step 140. As a result, total system fairness is improved as all STAs have the same chance for their air time requests to be received by the base station, and at the same time, the performance and capacity for the STAs to transmit their data, will not decrease.

Finally, the STA transmits the packets carrying the payload data (step 180) at the appropriate power level as been re-adjusted in step 170.

Figure 2:
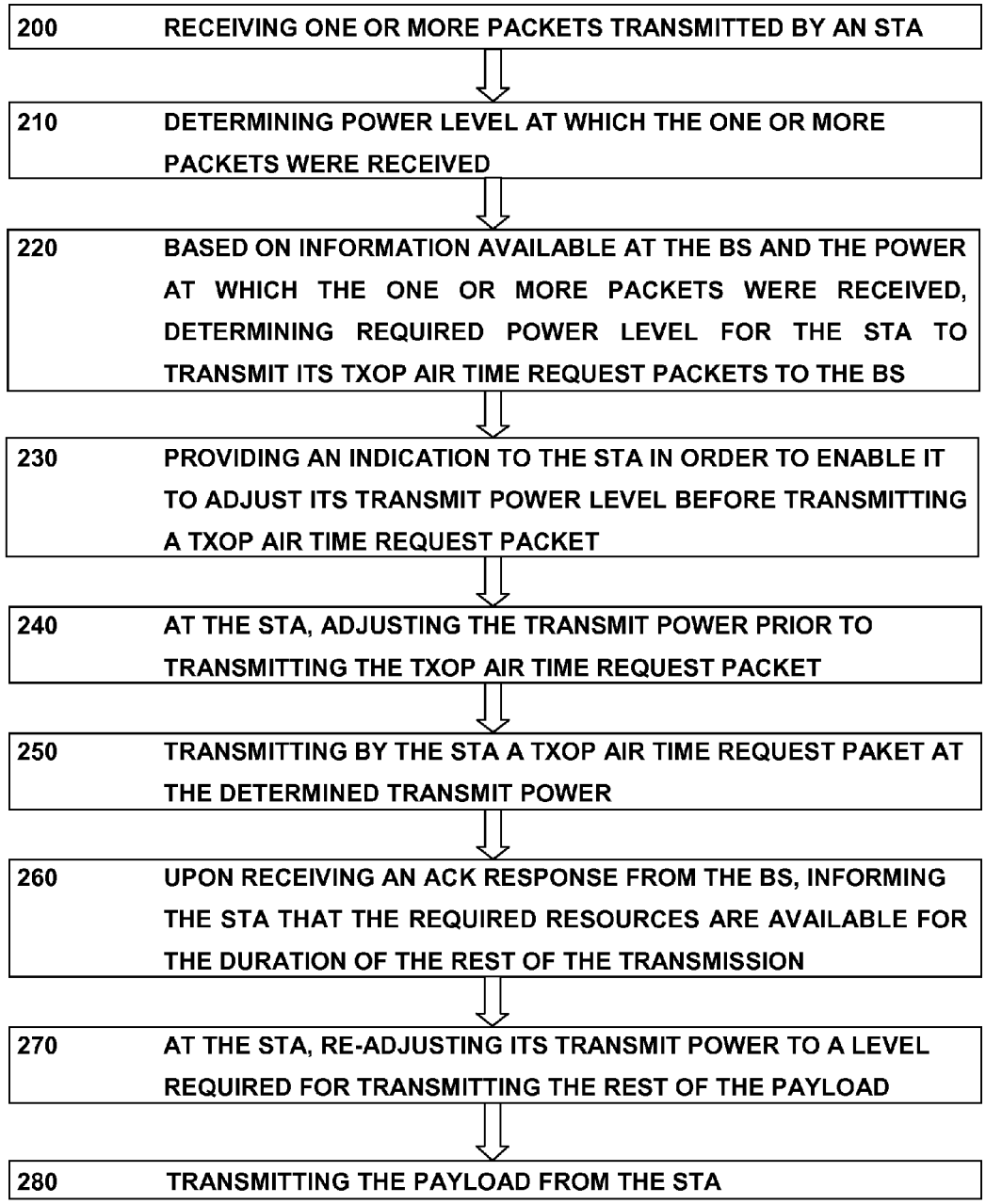
FIG. 2—demonstrates a flow chart of a method of implementing another embodiment of the present invention.

FIG. 2 demonstrates a flow chart of a method of implementing another embodiment of the present invention, by which a number of station units that belong to a WLAN network that is operative in accordance with the IEEE 802.11e Recommendation, send occasionally a transmission burst of packets. The first packet within the burst is treated as an air time request packet and in response to which, the access point returns an acknowledgement packet, indicating to the other STAs (as well as to itself) to refrain from occupying air time needed for the duration of the whole burst, which is called a Transmit Opportunity ("TXOP"). A TXOP is a bounded time interval during which a station unit can send as many frames as possible (as long as the duration of the transmissions does not extend beyond the maximum duration of the TXOP).

The base station (a.k.a access point) receives one or more packets transmitted by an STA served by that base station (step 200). Then, the base station determines the power level at which the various packets were received thereat (step 210) (e.g. by measuring its associated SNR).

Based on information available at the base station, and the power at which the packets were received, determining a power level/change in power level, for the STA to transmit its TXOP air time request packets to the base station (step 220). This determination is made by the base station so as to ensure that the power level for each of the STAs that will transmit their air time requests packets to the base station, is such that the packet would be received at the base station at substantially the same SNR as the other transmitted air time request packets.

Based on the determination made and the power level at which the one or more packets were received, the base station provides an indication (absolute or relative) to the STA that transmitted the packet(s) (step 230) to enable it to adjust its transmission power level before transmitting a TXOP air time request packet, wherein the transmission power level to which the STA is required to comply with is selected so that all of the air time request packets transmitted co-currently by that STA and by at least one other STA, will fail as they will be received at the base station at substantially the same SNR as the other co-currently transmitted air time request packets, and each of the respective STAs, sending the air time request packet that failed, will re-transmit another air time request packet later on.

Prior to transmitting the air time request packet by the STA (or any other of the plurality of STAs for that matter), the STA adjusts its transmit power (step 240) by adjusting it to a level which is in conformity with the indication provided by the base station.

Next, after having adjusted its transmission power to the required level, the TXOP air time request packet is transmitted at the adjusted transmission power (step 250) and upon receiving (step 260) an ACK response from the base station informing the STA that the resources are available for the duration of the rest of the transmission, the STA re-adjusts its transmit power to a level required for transmitting the rest of the payload (step 270).

It is to be noted that despite of the fact that each figures handled a different type of air time request packet, the solution itself may not distinguish between the different types of air time request packets, but relates to all of them at the same manner (i.e. same required received SNR at the base station and same TX power at the STA).

Finally, the STA transmits the packets carrying the payload data (step 280) at the appropriate power level as been re-adjusted in step 270.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. For example, the above description refers mainly to closed loop adjustments, however, as would be appreciated by those skilled in the art, such adjustments may also be carried out in an open loop configuration, such as when the AP advertizes a target SNR (and/or other parameters such as BS EIRP, NI every pre-determined period of time, etc.) and the STAs change their transmit power level accordingly. Furthermore, the described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A method for managing a wireless local area network comprising a plurality of station units (STAs), where each of the plurality of station units is adapted to wirelessly communicate with one or more access points, wherein the method comprises affecting power control over air time request packets transmitted by respective station units from among the plurality of STAs towards one of the one or more access points, so that all air time request packets are received at said access point at substantially the same Signal to Noise Ratio ("SNR"), and wherein said power control does not affect packets carrying payload data that precedes the air time request packets transmitted by the respective station units, wherein said method comprises the steps of:

(i) providing an indication to each of the plurality of STAs to enable each respective STA to adjust its transmission power level for transmitting an air time request packet, and wherein said transmission power level is determined so that each of the air time request packets transmitted by at least two of the STAs, when received at said access point would be at substantially the same Signal to Noise Ratio ("SNR") as any other transmitted air time request packet would be when received thereat;

(ii) at least one of the plurality of STAs, adjusting said transmit power prior to transmitting the air time request packet, to a level which is in conformity with the indication provided by the access point; and (iii) at the at least one STA, re-adjusting the transmit power to a different level for transmitting packets carrying payload data that would be transmitted following the transmission of said air time request packet.

2. The method of to claim 1, wherein step (i) further comprising: receiving at the access point at least one packet transmitted by the at least one STA and evaluating the power level at which said at least one packet was received at the access point.

3. The method of claim 1, wherein step (i) further comprising: determining a power level at which the at least one STA has to transmit said air time request packet, based on the evaluation and based on information available at the access point which relates to transmission powers of other STAs from among the plurality of STAs.

4. The method of claim 1, wherein said evaluation of the transmit power level of the at least one packet received, is based upon measurement of said power level carried out by the access point.

5. The method of claim 1, wherein the indication provided to the at least one STA which is associated with the required transmit power level, relates to a substantially minimum value allowed in the wireless local area network for receiving packets.

6. The method of claim 1, wherein the indication provided to the at least one STA which is associated with the required transmit power level, relates to a substantially minimum received SNR value needed to receive the air time request packet, according to its rate and modulation.

7. The method of claim 1, wherein the indication provided to the at least one STA, which is associated with the required transmit power level, relates to a lowest value of power at which packets that were transmitted by all currently transmitting STAs in the wireless local area network, were received at the access point.

8. The method of claim 1, wherein the indication provided to the at least one STA, which is associated with the required transmit power level, relates to the power level at which said at least one packet transmitted by the at least one STA, was received at the access point.

* * * * *